(12) United States Patent
Uesaka

(10) Patent No.: US 10,246,119 B2
(45) Date of Patent: Apr. 2, 2019

(54) STEERING COLUMN DEVICE

(71) Applicant: FUJI KIKO CO., LTD., Kosai-shi, Shizuoka (JP)

(72) Inventor: Yota Uesaka, Toyohashi (JP)

(73) Assignee: FUJI KIKO CO., LTD., Kosai-shi (JP)

( * ) Notice: Subject to any disclaimer, the term of this patent is extended or adjusted under 35 U.S.C. 154(b) by 0 days.

(21) Appl. No.: 15/084,973

(22) Filed: Mar. 30, 2016

(65) Prior Publication Data

US 2016/0288819 A1 Oct. 6, 2016

(30) Foreign Application Priority Data

Mar. 31, 2015 (JP) .................................. 2015-070750

(51) Int. Cl.
- *B62D 1/185* (2006.01)
- *B62D 1/184* (2006.01)
- *B62D 1/189* (2006.01)
- *B62D 1/16* (2006.01)

(52) U.S. Cl.
CPC ............... *B62D 1/185* (2013.01); *B62D 1/16* (2013.01); *B62D 1/184* (2013.01); *B62D 1/189* (2013.01)

(58) Field of Classification Search
CPC .......... B62D 1/16; B62D 1/184; B62D 1/185; B62D 1/189; B62D 1/19; B62D 1/195
See application file for complete search history.

(56) References Cited

U.S. PATENT DOCUMENTS

| | | | | |
|---|---|---|---|---|
| 4,890,505 A * | 1/1990 | Kinoshita | .............. | B62D 1/184 74/493 |
| 5,520,416 A * | 5/1996 | Singer, III | ............. | B62D 1/181 280/775 |
| 5,606,892 A * | 3/1997 | Hedderly | ................. | B62D 1/16 280/775 |
| 5,820,163 A * | 10/1998 | Thacker | ................. | B62D 1/184 280/775 |
| 6,116,647 A * | 9/2000 | Fischer | .................... | B62D 1/16 280/750 |
| 6,357,318 B1 | 3/2002 | Koellisch et al. | | |
| 7,077,027 B2 * | 7/2006 | Krizan | ..................... | B62D 1/16 280/775 |

(Continued)

FOREIGN PATENT DOCUMENTS

| | | |
|---|---|---|
| CN | 102700599 A | 10/2012 |
| EP | 2 505 456 A2 | 10/2012 |

(Continued)

OTHER PUBLICATIONS

Extended European Search Report dated Aug. 12, 2016, 7 pages.

(Continued)

*Primary Examiner* — Barry Gooden, Jr.
(74) *Attorney, Agent, or Firm* — Foley & Lardner LLP

(57) ABSTRACT

A steering column device includes a cylindrical inner jacket; a cylindrical outer jacket in which the inner jacket is slidably inserted; and a steering shaft rotatably supported in the inner jacket and the outer jacket. The outer jacket is divided into a molded first half member and a molded second half member at a plane including an axis of the outer jacket. According to this steering column device, in molding the outer jacket, it is not necessary to set a draft for a core along the axial direction on the inner circumferential surface of the outer jacket.

5 Claims, 7 Drawing Sheets

(56) References Cited

U.S. PATENT DOCUMENTS

| | | | |
|---|---|---|---|
| 8,313,120 B2* | 11/2012 | Meyers | B62D 1/16 280/771 |
| 2004/0083844 A1* | 5/2004 | Krizan | B62D 1/16 74/492 |
| 2005/0204852 A1* | 9/2005 | Li | B62D 1/187 74/492 |
| 2006/0028010 A1 | 2/2006 | Yamada | |
| 2008/0196535 A1* | 8/2008 | Dole | B62D 1/16 74/492 |
| 2009/0056493 A1 | 3/2009 | Dubay et al. | |
| 2012/0085194 A1 | 4/2012 | Inoue | |
| 2012/0247258 A1 | 10/2012 | Maniwa et al. | |
| 2013/0118292 A1* | 5/2013 | Sulser | B62D 1/184 74/493 |
| 2013/0133462 A1* | 5/2013 | Yamamoto | B62D 1/184 74/493 |
| 2013/0213174 A1 | 8/2013 | Suzuki et al. | |
| 2013/0240286 A1* | 9/2013 | Asada | B62D 1/16 180/417 |
| 2014/0076091 A1 | 3/2014 | Yokota et al. | |
| 2016/0264168 A1* | 9/2016 | Kubota | B62D 1/185 |

FOREIGN PATENT DOCUMENTS

| | | |
|---|---|---|
| JP | 2001-347953 A | 12/2001 |
| JP | 2012-214215 A | 11/2012 |
| JP | 2014-058200 A | 4/2014 |

OTHER PUBLICATIONS

Chinese Office Action, dated Sep. 22, 2017, 6 pages.
Japanese Office Action and English translation, dated Oct. 16, 2018, 6 pages.

* cited by examiner

STEERING COLUMN DEVICE

TECHNICAL FIELD

This invention relates to a steering column device which can carry out a telescopic adjustment and a tilt adjustment of a steering wheel.

BACKGROUND OF THE INVENTION

Japanese Patent Application Publication 2001-347953 discloses a steering device for vehicle having an inner column and an outer column. The inner column rotatably supports one end of a steering shaft, and the outer column rotatably supports the other end of the steering shaft and slidably fits the inner column thereinto.

In conventional steering devices as disclosed in Japanese Patent Application Publication 2001-347953, a cylindrical outer column is formed by casting. In case of casting the cylindrical outer column, a draft to pull a core out is required on an inner circumferential surface of the outer column. Furthermore, considering the telescopic adjustment and the stroke in collision, it is preferable that a part where the inner column and the outer column fit each other is cylindrical to secure a constant clearance therebetween.

Accordingly, in the casted outer column, the draft of the inner circumferential surface is cut by machining after casting so that at least the inner circumferential surface of a part where the inner column is fit has an internal diameter constantly changing along the axial direction.

SUMMARY OF THE INVENTION

However, in that case, there is a problem that the manufacturing cost of the outer column tends to be high.

Furthermore, there is a problem that cutting of the inner circumferential surface of the outer column restricts the size of the outer column, the shape of each part of the outer column, the size of a bearing which is arranged in the inside of the outer column, etc.

Furthermore, by such cutting, in case that a machining trace perpendicularly intersecting with the sliding direction of the inner column occurs in the inner circumferential surface of the outer column or that its surface roughness gets worse, there is a risk that operation performance, slide noise, wear, etc. in the telescopic adjustment of a steering wheel get worse.

A steering column device of the present invention comprises:

a cylindrical inner jacket;

a cylindrical outer jacket in which the inner jacket is slidably inserted; and a steering shaft rotatably supported in the inner jacket and the outer jacket, wherein the outer jacket is divided into a molded first half member and a molded second half member at a plane including an axis of the outer jacket.

By this steering column device, in molding the outer jacket, it is not necessary to set a draft for a core along the axial direction on the inner circumferential surface of the outer jacket. Therefore, it suffices to make the outer jacket have a constant inner diameter at a part where the inner jacket is inserted. This provides a constant clearance between the inner circumferential surface of the outer jacket and the outer circumferential surface of the inner jacket.

Furthermore, on the inner circumferential surface of the outer jacket, a first groove, which receives therein a separate member, or a second groove, which provides weight reduction of the outer jacket, may be formed along a circumferential direction of the outer jacket.

Furthermore, on the inner circumferential surface of the outer jacket, a third groove, which receives a member that limits an axial movement of the inner jacket relative to the outer jacket, may be formed.

Advantageous Effect of the Invention

According to the present invention, it is not necessary to conduct cutting to the molded first half member and the molded second half member to set a constant clearance between these molded half members and the outer circumferential surface of the inner jacket. Therefore, it is possible to fulfill cost reduction thanks to omission of cutting. Furthermore, it is possible to prevent occurrence of the machining trace and deterioration of surface roughness, which go with cutting. Thereby, it is possible to prevent operation performance, slide noise, wear, etc. in the telescopic adjustment from getting worse.

Furthermore, as it is not necessary to conduct cutting to the inner circumferential surface of the outer jacket, the size of the outer jacket, the shape of each part of the outer jacket, the size of the bearing which is arranged in the inside of the outer jacket, etc. are not restricted.

It is possible to install a separate member such as the bearing, which is arranged in the inside of the outer jacket, in the first groove from a radial direction by setting the first groove, which receives therein the separate member, in the inner circumferential surface of the outer jacket. Therefore, as the first groove also serves as a locking structure which prevents the separate member from slipping out in the axial direction, it is not necessary to separately form the locking structure or to set such locking with another member. Thereby, it is possible to relatively simplify the installation process of the separate member.

Furthermore, it is possible to make section modulus of the outer jacket high by setting the second groove for providing weight reduction in the inner circumferential surface of the outer jacket. Thereby, it is possible to make rigidity of the outer jacket high.

Furthermore, it is possible to install a member, which limits an axial movement of the inner jacket relative to the outer jacket, in the third groove from a radial direction by setting the third groove receiving the member in the inner circumferential surface of the outer jacket. Therefore, as the third groove also serves as a locking structure which prevents the member from slipping out in the axial direction, it is not necessary to separately form the locking structure or to set such locking with another member. Thereby, it is possible to relatively simplify the installation process of the inner jacket.

DETAILED DESCRIPTION OF THE INVENTION

Hereinafter, an embodiment of the present invention is explained in detail, based on the drawings. It is an explanation about a steering column device 1 in the first embodiment of the present invention with reference to FIG. 1 to FIG. 4.

Figure 1:
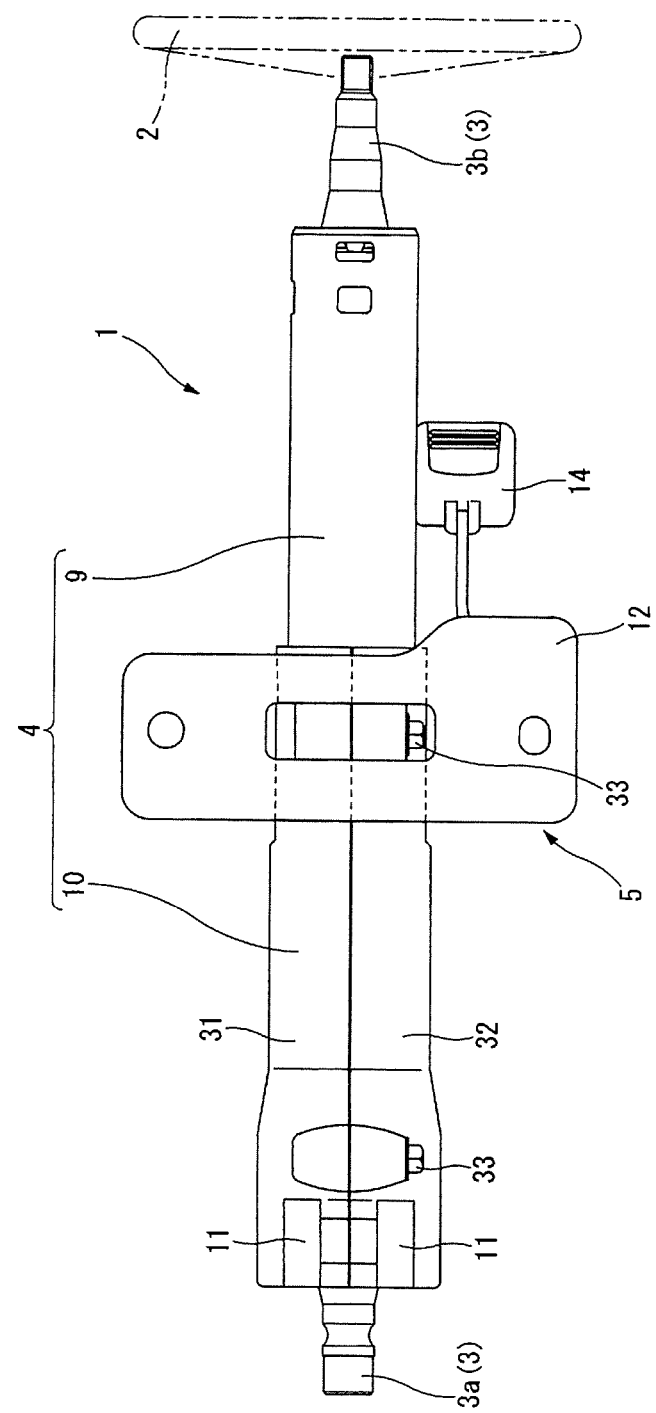
FIG. 1 is a plan view showing the first embodiment of the steering column device according to the present invention.
Figure 2:
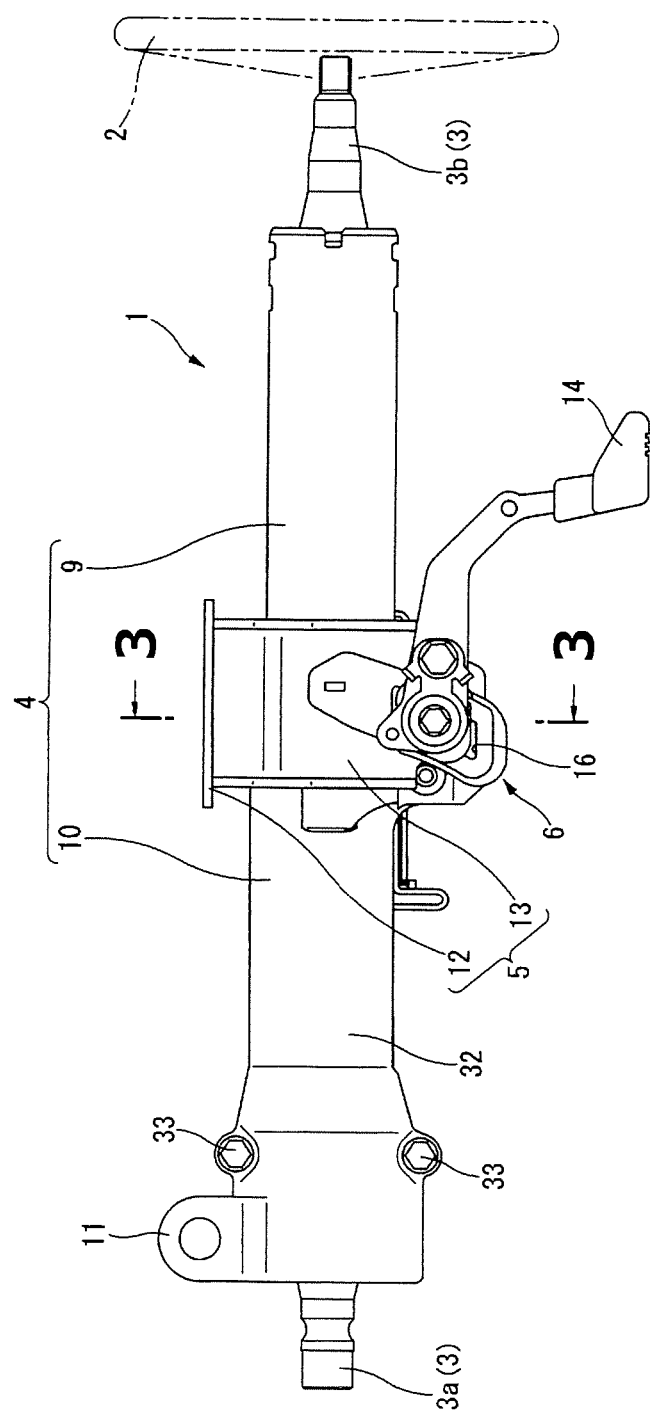
FIG. 2 is a front view showing the first embodiment of the steering column device according to the present invention.

The steering column device 1 is mounted on a vehicle such as an automobile and can carry out a telescopic adjustment (back and forth direction) and a tilt adjustment (upper and lower direction) of a steering wheel 2 with a single lever operation. As shown in FIGS. 1 and 2, the steering column device 1 generally comprises a steering shaft 3 where the steering wheel 2 is installed, a jacket 4 which rotatably supports the steering shaft 3, a bracket 5 which supports the center of the jacket 4 on the side of the car body, a lock mechanism 6 which fixes the jacket 4 in a state after the telescopic and/or tilt adjustment.

Figure 4:
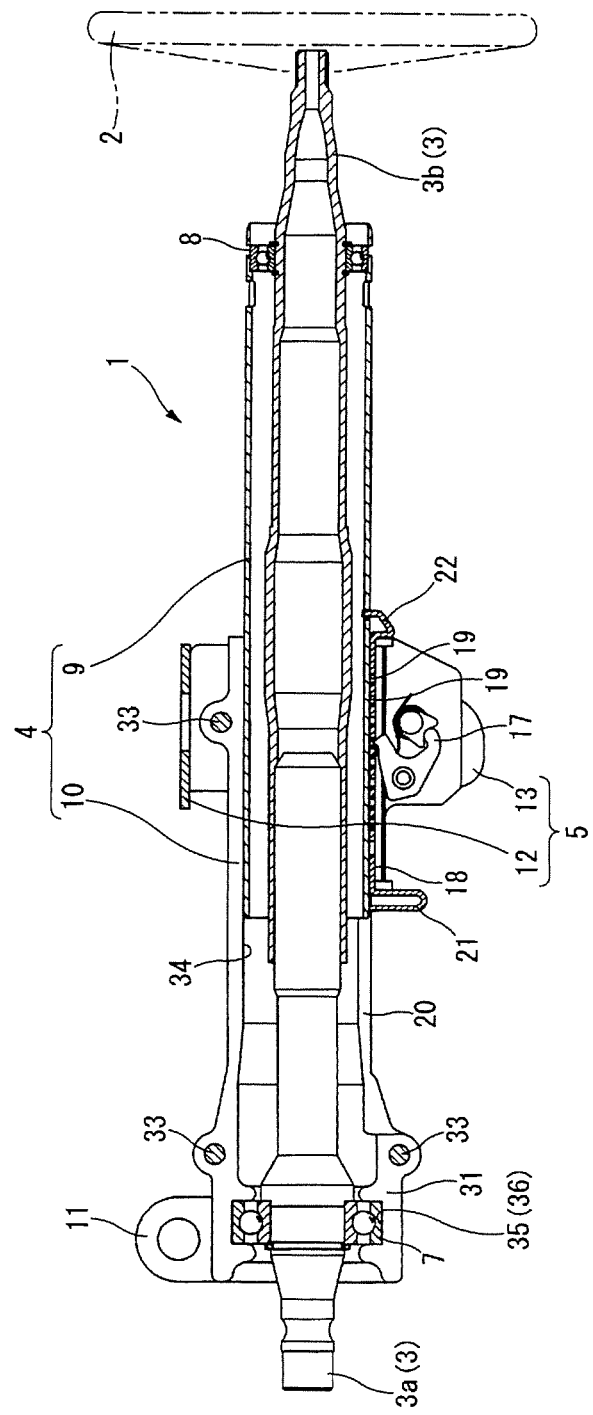
FIG. 4 is a longitudinal sectional view showing the first embodiment of the steering column device according to the present invention.

The steering shaft 3 comprises a lower shaft 3a connected with wheels (not shown) and an upper shaft 3b connected with the steering wheel 2. Furthermore, as shown in FIG. 4, the steering shaft 3 is rotatably supported in the jacket 4 through bearings 7, 8. The lower shaft 3a and the upper shaft 3b are connected with each other so that their relative rotation is limited and that their relative movement in the axial direction is possible. That is, the steering shaft 3 is telescopic as a whole.

The jacket 4 comprises a cylindrical inner jacket 9 and a cylindrical outer jacket 10. One end of the inner jacket 9 is slidably inserted and fit in one end of the outer jacket 10. That is, the jacket 4 is telescopic as a whole. The inner jacket 9 is made of, for example, aluminum alloy and made by casting as a single member. The outer jacket 10 is made of, for example, aluminum alloy and formed by combining a molded first half member 31 and a molded second half member 32. The jacket 4 is supported on the side of the car body by a jacket side bracket 11, which is integrally formed at the other end of the outer jacket 10.

Figure 3:
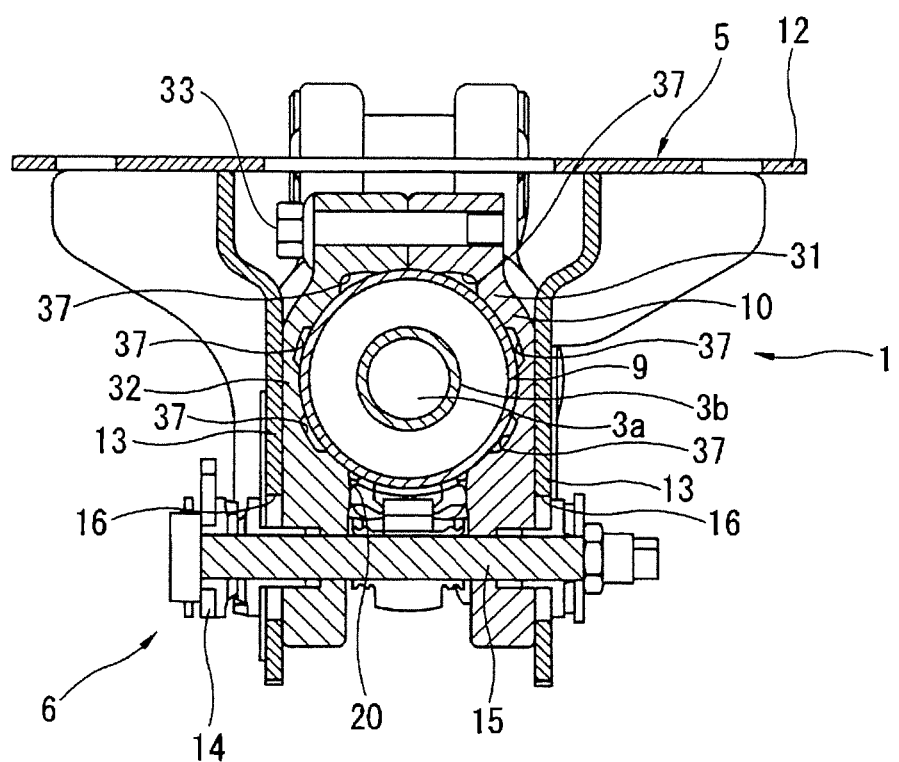
FIG. 3 is a sectional view taken along lines 3-3 of FIG. 2.

As shown in FIG. 3, the bracket 5 comprises a base 12 fixed on the car body (not shown) and a pair of clamping plates 13 perpendicularly intersecting with the base 12, and its shape is U-shape as a whole. A pair of the clamping plates 13 clamps the part in which the outer jacket 10 fit with the inner jacket 9 by facing each other and is equipped with the lock mechanism 6.

In the lock mechanism 6, the lock bolt 15, which passes through a pair of the clamping plates 13 and the outer jacket 10, is turned by turning an operation lever 14, and thereby it is possible to fasten a pair of the clamping plates 13 or to release the fastening. That is, to fasten a pair of the clamping plates 13 enables the inner jacket 9 to be fixed to the outer jacket 10 with friction which occurs in fastening the part where the outer jacket 10 fit with the inner jacket 9. Furthermore, the fastening of the part in which the outer jacket 10 fit with the inner jacket 9 is released by releasing the fastening of a pair of the clamping plates 13, thereby enables the telescopic adjustment and the tilt adjustment of the jacket 4.

Reference numeral 16 in FIGS. 2 and 3 represents a tilt hole for the tilt adjustment. The tilt holes are formed through a pair of the clamping plates 13, and the lock bolt 15 passes therethrough. Furthermore, reference numeral 17 in FIG. 4 represents a lock member, which swings with the rotation of the operation lever 14. The lock member 17 can mechanically limit the movement of the inner jacket 9 in the axial direction, because its tip engages with one of holes 19 of a plate member 18 fixed on the inner jacket 9 when fixing the inner jacket 9 to the outer jacket 10 by turning the operation lever 14 to fasten a pair of the clamping plates 13. The holes 19 are plurally formed in the plate member 18 and arranged along the axial direction of the outer jacket 10. The plate member 18 is exposed to outside from a slit 20 which is formed from one end of the outer jacket 10 to the other end side. Furthermore, it is possible for the plate member 18 to engage with the lock member 17. Reference numeral 21 represents a telescopic stopper, which is formed on the plate member 18 and sets the limit position of a rearward side of a vehicle in the telescopic adjustment of the steering wheel 2. Reference numeral 22 in FIG. 4 represents a telescopic stopper, which is formed on the plate member 18 and sets the limit position of a forward side of a vehicle in the telescopic adjustment of the steering wheel 2. Both telescopic stoppers 21 and 22 can limit the slide movement of the inner jacket 9 when abutted against the lock bolt 15.

The outer jacket 10 described above is divided into a molded first half member 31 and a molded second half member 32 at a plane including an axis of the outer jacket 10 (they are respectively positioned up and down in FIG. 1 and right and left in FIG. 3). As shown in FIG. 4, this outer jacket 10 of the first embodiment is formed as an integral body by fixing the molded first half member 31 and the molded second half member 32 on each other by one bolt 33 at a top position at one end and by two bolts 33 at top and bottom positions at the other end in the axial direction of the outer jacket 10. As shown in FIG. 3, each of the molded first half member 31 and the molded second half member 32 has a nearly arcuate shape in section for receiving the inner jacket 9 and is individually formed by casting.

The molded first half member 31 and the molded second half member 32 are set so that curvature of an inner side surface 34 where the inner jacket 9 is inserted is a predetermined constant value along the axial direction. That is, the outer jacket 10 is formed so that the inner side surface 34 where the inner jacket 9 is inserted has a circular section, and that the internal diameter of the inner side surface 34 is a predetermined constant diameter in the axial direction of the outer jacket 10. The internal diameter of the inner side surface 34 of the outer jacket 10 is set so as to have a predetermined constant clearance between an outer side surface of the inner jacket 9 and the inner side surface 34 of the outer jacket 10 in a condition that the fastening of a pair of the clamping plates 13 is released.

As shown in FIG. 4, an inside surface of the molded first half member 31 has a bearing-receiving semiannular groove 35 formed along the circumferential direction of the outer jacket 10. Furthermore, although not shown in FIG. 4, an inside surface of the molded second half member 32 also has the bearing-receiving semiannular groove 35. Furthermore, a bearing-receiving annular groove (first groove) 36 is formed by combining these two bearing-receiving semiannular grooves 35 of the molded first and second half members 31, 32. The first groove 36 receives therein the bearing 7 as a separate member which rotatably supports the other end of the steering shaft 3, that is, the other end of the lower shaft 3a.

As shown in FIG. 3, at a desired position, the inside surface of the first or second half member 31, 32 has a second groove 37 along the circumferential direction of the outer jacket 10. The second groove 37 provides weight reduction of the outer jacket 10. In FIG. 3, the second grooves 37 are formed at three places of the first or second half member 31, 32 in the circumferential direction. The second groove 37 of the present embodiment is formed so as to extend by a predetermined length in the axial direction of the outer jacket 10. Furthermore, it is possible to use the second groove 37 as a grease receiver. It is possible to properly change the place and the number of the second grooves formed in the first and second half members 31, 32.

In such a steering column device 1 of the first embodiment, it is not necessary to set a draft for a core along the axial direction on the inner circumferential surface of the outer jacket 10 when casting the outer jacket 10 because the outer jacket 10 is composed of the two half members 31 and 32. Therefore, it suffices to make the outer jacket 10 have a constant inner diameter at a part where the inner jacket 9 is inserted. This provides a constant clearance between the inner circumferential surface of the outer jacket 10 and the outer circumferential surface of the inner jacket 9. That is, it is not necessary to conduct cutting to the molded first half member 31 and the molded second half member 32 in order to set a constant clearance between these molded half members 31, 32 and the outer circumferential surface of the inner jacket 9. Therefore, it is possible to fulfill cost reduction thanks to omission of cutting. Furthermore, it is possible to prevent occurrence of the machining trace and deterioration of surface roughness, which go with cutting. Thereby, it is possible to prevent operation performance, slide noise, wear, etc. in the telescopic adjustment from getting worse.

Furthermore, as it is not necessary to conduct cutting to the inner circumferential surface of the outer jacket 10, the size of the outer jacket 10, the shape of each part of the outer jacket 10, the size of the bearing 7 which is arranged in the inside of the outer jacket 10, etc. are not restricted. Thereby, it is possible to enhance the design flexibility of the outer jacket 10.

Furthermore, it is possible to install the bearing 7 from a radial direction to the first groove 36 which is formed in the side of the inner circumference because the outer jacket 10 is composed of the two half members 31 and 32. That is, it is possible to form the two bearing-receiving semiannular grooves 35 on the inner circumferential surface of the outer jacket 10 in advance. The first annular groove 36 formed by combining these semiannular grooves 35 also serves as a looking structure which prevents the separate member, such as the bearing 7, from slipping out in the axial direction. Therefore, it is not necessary to separately form the locking structure or to set such locking with another member. Thereby, it is possible to relatively simplify the installation process of the separate member such as the bearing 7.

Furthermore, because of being composed of the two half members 31 and 32, it is possible to form the second groove 37, which provides weight reduction, along a circumferential direction at a desired position of the inner circumferential surface of the outer jacket 10. Thereby, it is possible to make rigidity of the outer jacket 10 relatively high. The reason is that, in case of the identical outline dimensions, it is possible to have a larger section modulus of the outer jacket 10 by forming a groove for providing weight reduction on the inner circumferential surface of the outer jacket 10, as compared with that by forming it on the outer circumferential surface of the outer jacket 10.

Figure 5:
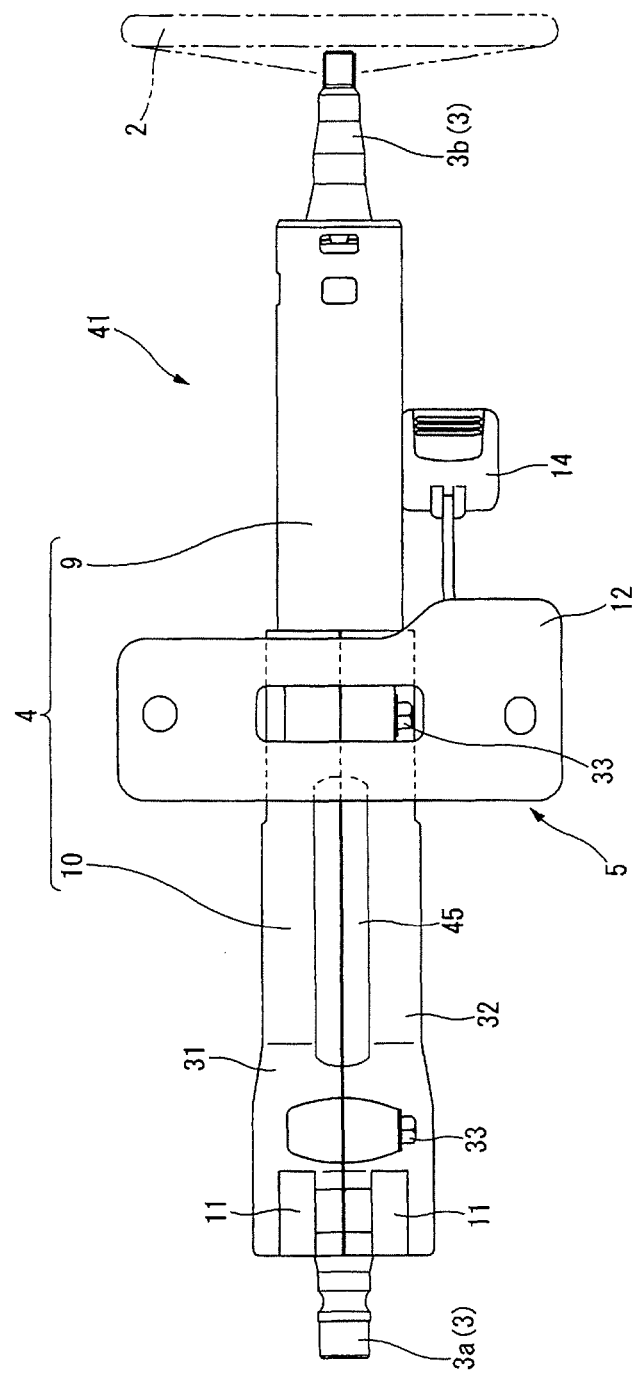
FIG. 5 is a plan view showing the second embodiment of the steering column device according to the present invention.
Figure 6:
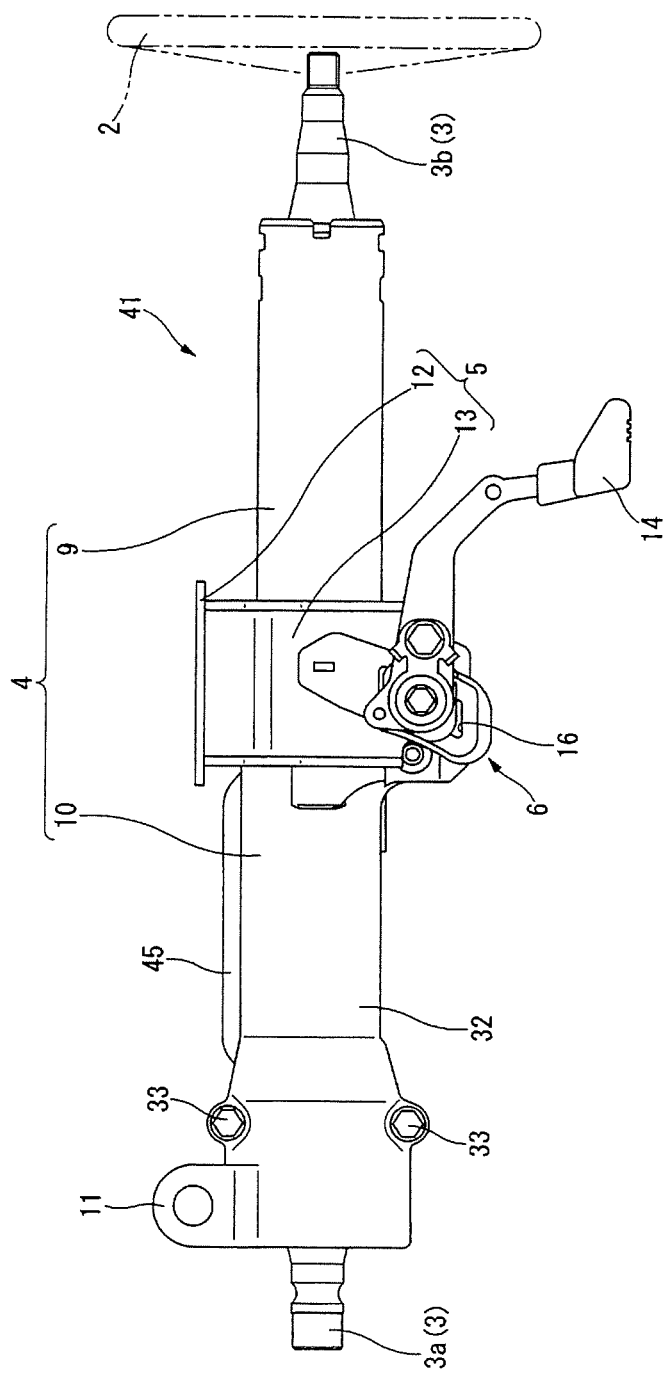
FIG. 6 is a front view showing the second embodiment of the steering column device according to the present invention.
Figure 7:
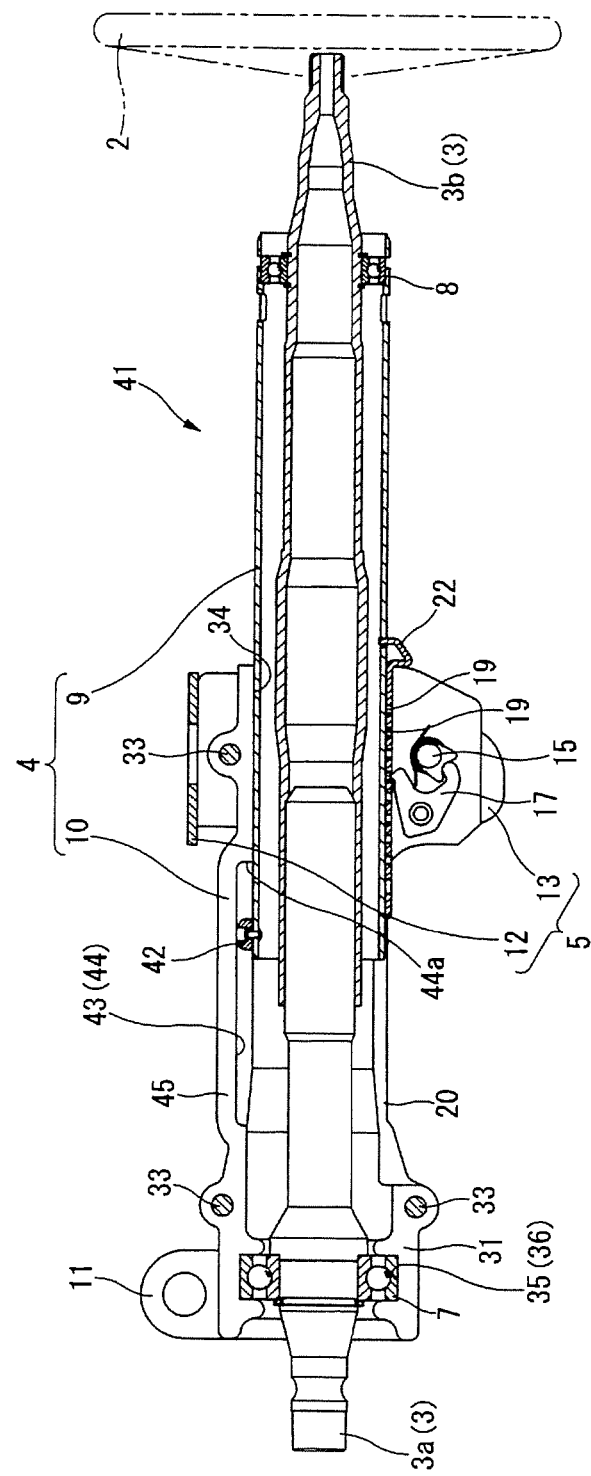
FIG. 7 is a longitudinal sectional view showing the second embodiment of the steering column device according to the present invention.

Next, it is an explanation about a steering column device 41 in the second embodiment of the present invention with reference to FIG. 5 to FIG. 7. Components which are identical with those of the steering column 1 of the first embodiment are denoted by the same reference numerals, and overlapping explanations are omitted.

The steering column device 41 of the second embodiment has a structure which is approximately identical with that of the steering column device 1 of the first embodiment. As shown in FIG. 7, a limiting member-receiving groove (a half groove) 43 is formed on the inside surface of the first half member 31, which is also the inner circumferential surface of the outer jacket 10. Furthermore, although not shown in FIG. 7, an inside of the molded second half member 32 also has another limiting member-receiving groove (another half groove) 43. Thus, a limiting member-receiving groove (third groove) 44 that is continuous in the circumferential direction is formed by combining these limiting member-receiving, half grooves 43 of the molded first and second half member 31, 32. The third groove 44 receives a telescopic stopper (limiting member) 42 which sets the limit position of a rearward side of a vehicle in the telescopic adjustment. This third groove 44 has a structure that doesn't directly communicates with outside, as its both ends along the axial direction of the outer jacket 10 have not reached the end faces of the outer jacket 10. Therefore, foreign substances are hard to get into the third groove 44 from outside, so the telescopic stopper 42 is hard to bite the foreign substances in the third groove 44.

The telescopic stopper 42 is installed on the other end side of the inner jacket 9 and is a member which is different from the inner jacket 9. Alternatively, a part of the other end side of the inner jacket 9 may be made to jut out the outer circumferential side by cutting and raising, and it is possible to substitute the jutting part for the telescopic stopper 42.

Furthermore, reference numeral 45 in FIGS. 5 to 7 represents a swelling part, which relatively juts out outside to secure a wall thickness in the setting position of the third groove 44.

In such second embodiment, it is possible to install the telescopic stopper 42, which is to be arranged in the inside of the outer jacket 10, in the third groove 44 from a radial direction. Therefore, the telescopic stopper 42 prevents the inner jacket 9 from slipping out in the axial direction from the outer jacket 10, when abutted against an inside wall 44a of the swelling part 45 of the outer jacket. That is, as the third groove 44 also serves as a locking structure which prevents the inner jacket 9 from slipping out in the axial direction, it is not necessary to separately form the locking structure or to set such locking with another member. Thereby, it is possible to relatively simplify the installation process of the inner jacket 9.

In this second embodiment, it is possible to obtain the same effects as those of the first embodiment described above.

While the foregoing is a description of the preferred embodiments of the invention, it will be understood that the invention is not limited to the particular embodiments shown and described herein, but that various changes and modifications may be made without departing from the scope of this invention as defined by the following claims.

Furthermore, although the outer jacket 10 has a structure that is half divided into right and left at a plane including the axis of the outer jacket 10 in each embodiment described above, it may have a structure that is half divided up and down in FIG. 3 at a plane including the axis of the outer jacket 10.

Furthermore, the outer jacket 10 of each embodiment described above is made of metal. However, a resin, a fiber reinforced plastic (FRP), etc. may be used as the material.

In the outer jacket 10 of each embodiment described above, the molded first half member 31 and the molded second half member 32 are integrated by the bolts 33. However, they may be integrated by using an adhesive without the bolts 33.

In the outer jacket 10 of each embodiment described above, a cross-sectional shape of the inner circumferential surface of the part of the outer jacket 10 where the outer jacket 10 fits the inner jacket 9 is circle. However, the cross-sectional shape of the inner circumferential surface is not limited to circle, and it is possible to form it as a polygon such as octagon. In case that the cross-sectional shape of the inner circumferential surface is another shape except circle, it is possible to prevent relative rotation between the outer jacket 10 and the inner jacket 9 without using another member or another structure.

This application is based on a prior Japanese Patent Application No. 2015-070750 (filed Mar. 31, 2015). The entire contents of the Japanese Patent Application No. 2015-070750 are hereby incorporated by reference.

What is claimed is:

1. A steering column device comprising:
   a cylindrical inner jacket;
   a cylindrical outer jacket in which the inner jacket is slidably inserted; and
   a steering shaft rotatably supported in the inner jacket and the outer jacket,
   wherein the outer jacket is divided into a molded first half member and a molded second half member at a plane including an axis of the outer jacket,
   wherein the outer jacket comprises a particular groove on an inner circumferential surface of the outer jacket, and
   the particular groove receives a particular member that limits an axial movement of the inner jacket relative to the outer jacket, the particular member setting a limit position in a rearward side of a vehicle in the axial movement of the inner jacket and being provided on the inner jacket, and
   wherein the particular groove has a structure that does not directly communicate with an outside and is formed along an axial direction of the outer jacket.

2. The steering column device as claimed in claim 1, wherein the outer jacket comprises a second groove on an inner circumferential surface of the outer jacket, the second groove extending along an axial direction of the outer jacket and providing weight reduction of the outer jacket.

3. The steering column device as claimed in claim 1, wherein the outer jacket comprises a plurality of second grooves on an inner circumferential surface of the outer jacket, the plurality of second grooves being arranged at intervals along a circumferential direction of the outer jacket, each of the plurality of second grooves extending along an axial direction of the outer jacket and providing weight reduction of the outer jacket.

4. The steering column device as claimed in claim 1, wherein the outer jacket comprises a first groove on an inner circumferential surface of the outer jacket along a circumferential direction of the outer jacket, the first groove receiving therein a first member.

5. The steering column device as claimed in claim 4, wherein the first member is a bearing that supports the steering shaft in the outer jacket.

* * * * *